United States Patent
Büllesfeld et al.

(10) Patent No.: US 7,374,714 B2
(45) Date of Patent: May 20, 2008

(54) METHOD AND DEVICE FOR SHAPING A STRUCTURED BODY AND BODY PRODUCED ACCORDING TO SAID METHOD

(75) Inventors: Frank Büllesfeld, Frankfurt (DE); Paul Kissl, Mainz (DE); Sabine Lehnicke, Essenheim (DE); Martin Zimmermann, Mahlberg (DE); Christian Kunert, Mainz (DE); Bernd Hoppe, Ingelheim (DE); Volker Plapper, Saulheim (DE)

(73) Assignee: Schott AG, Mainz (DE)

( * ) Notice: Subject to any disclaimer, the term of this patent is extended or adjusted under 35 U.S.C. 154(b) by 130 days.

(21) Appl. No.: 10/490,808

(22) PCT Filed: Sep. 30, 2002

(86) PCT No.: PCT/EP02/10960

§ 371 (c)(1),
(2), (4) Date: Sep. 24, 2004

(87) PCT Pub. No.: WO03/029156

PCT Pub. Date: Apr. 10, 2003

(65) Prior Publication Data

US 2005/0031831 A1    Feb. 10, 2005

(30) Foreign Application Priority Data

Sep. 28, 2001   (DE)   ................ 101 48 147
Jun. 7, 2002    (DE)   ................ 102 25 618

(51) Int. Cl.
*B29C 55/00*    (2006.01)

(52) U.S. Cl. .................. 264/479; 264/492; 264/167

(58) Field of Classification Search ............ 264/479, 264/481, 492, 288.4, 291; 65/105, 385, 425, 65/441, 61, 176
See application file for complete search history.

(56) References Cited

U.S. PATENT DOCUMENTS 3,620,706 A * 11/1971 Spanoudis ............... 65/114

(Continued)

FOREIGN PATENT DOCUMENTS

DE    39 02 988    8/1990

(Continued)

OTHER PUBLICATIONS

Jean et al, "Effect of Crystallizable Cordierite Glass on devitrification of Pyrex Borosilicate Glass", Materials Science and Engineering A199 (1995), pp. L11-L13*

*Primary Examiner*—Monica A Huson
(74) *Attorney, Agent, or Firm*—Ohlandt, Greeley, Ruggiero & Perle, L.L.P.

(57) ABSTRACT

A process for shaping a body with elongate structures on its surface, bodies produced using the process, and to apparatuses having these bodies are provided. For this purpose, a preform is provided, at the surface, with structures which are elongate along one direction, the preform is heated at least in one region and the preform is drawn in the heated state until at least part of the preform has adopted a cross section which substantially corresponds to the desired cross-sectional shape or final cross-sectional shape. The preform is heated by means of radiation which has a spectral distribution which is such that at most half of the radiation power is absorbed during a single pass through the material.

20 Claims, 9 Drawing Sheets

U.S. PATENT DOCUMENTS

| | | | |
|---|---|---|---|
| 5,721,050 A | 2/1998 | Roman et al. | 428/397 |
| 5,851,666 A * | 12/1998 | Nonaka et al. | 428/380 |
| 7,000,430 B1 * | 2/2006 | Fotheringham et al. | 65/33.2 |
| 2005/0274149 A1 * | 12/2005 | Hoppe et al. | 65/411 |

FOREIGN PATENT DOCUMENTS

| | | | |
|---|---|---|---|
| DE | 197 36 732 | | 3/1999 |
| EP | 0 926 101 | | 6/1999 |
| EP | 0 929 101 | | 7/1999 |
| FR | 2 505 472 | | 11/1982 |
| FR | 2 788 267 | | 7/2000 |
| GB | 2 108 483 | | 5/1983 |
| GB | 2108483 | * | 5/1983 |
| GB | 2108483 A | * | 5/1983 |
| WO | WO 00/56675 | * | 9/2000 |
| WO | 01/35126 | | 5/2001 |

* cited by examiner

METHOD AND DEVICE FOR SHAPING A STRUCTURED BODY AND BODY PRODUCED ACCORDING TO SAID METHOD

BACKGROUND OF THE INVENTION

1. Field of the Invention

The invention relates to a process for shaping a body with elongate structures, such as in particular depressions, on its surface, and to bodies produced using the process and to devices comprising bodies of this type. Moreover, the invention relates to an apparatus for carrying out the process for shaping a body of this type.

2. Description of Related Art

It is known for optical fibers to be drawn from fiber preforms in the heated state and thereby to obtain greatly reduced fiber cross sections for optical waveguides.

In the field of microsystems technology, processes aim to introduce very fine structures into various materials. The structures are usually punctiform or linear elevations or depressions. In the finished components, these structures are used, for example, as passages for controlling very fine flows of liquid or gas.

In many applications, these structures are formed uniformly over the entire component in one direction, for example in the longitudinal direction, for example in the form of continuous passages or ribs. Components of this type are included, for example, in miniaturized heat exchangers or in components which are used to move optical fibers into a defined position and then hold them in place in this position.

Furthermore, PCT/JP 00/07955 describes a process for producing lenses which are substantially in rod form, in which reduced cross sections of a blank are obtained by redrawing this blank. Both the abovementioned fibers and the substantially rod-like lenses are each rounded on the outside, which is extremely favorable for the shaping of heated glass, since rounding of this nature can be formed automatically by viscous materials on account of their surface tension, and are therefore assisted during shaping.

DE 39 02 988 A1 describes a process for producing a support, which is provided with a groove, for an optical waveguide connector, in which the V groove is ground in with an aperture angle of approximately 90°, and the preform, after suitable heating, is drawn to a diameter of approximately 1/10 of the original diameter. If appropriate, further recesses are provided. However, the process appears in need of improvement with regard to the yield and with regard to the tolerances which can be achieved.

FR 2 788 267 A1 relates to a process for producing glass spacers, in which a mother glass with a cross section which is similar to the desired cross section, in a heated state at a viscosity of from $10^5$ to $10^9$, is drawn, and in which the drawn glass is cut into a large number of glass spacers.

EP 0 929 101 A1 describes a stamp for the press-forming of glass elements with a platinum film.

DE 197 36 732 A1 describes a device and process for machining a workpiece by means of laser light.

Furthermore, FR 2 505 472 describes an apparatus for producing optical fibers with a device for concentrating infrared energy.

Silicon substrates with V grooves which have been produced by etching are in widespread use in optical information and communications technology in order in this way to achieve precisely predefined lateral spacings. In this context, it is extremely advantageous that the lateral positioning accuracy is substantially defined by crystallographic planes in the silicon and that it is possible to use highly accurate photolithographic processes. However, a drawback is the fixed angle of the V-shaped groove, which is substantially predetermined by the crystallographic orientation of the silicon and selective etching rates during photolithographic patterning. The high price of both the silicon substrates, which are substantially in single crystal form, and of the photolithographic processes represent significant obstacles to inexpensive mass production.

By contrast, when a structured preform is being drawn out or redrawn, the problem arises that the initial drawing does not lead to the structures of the preform being deformed to scale, and consequently for many applications the shape of the preform cannot be reproduced with sufficient accuracy in the drawn workpieces. For example, it is known from GB 2 108 483 A that shape changes of this type are dependent, inter alia, on the temperature, the cross section of the preform, the tensile force used for drawing and the viscoelastic properties of the preform material. Deformations which may occur during redrawing include pin-cushion deformations, which lead to a concave curvature of surfaces which were originally planar, and also to edge rounding. The influence of the drawing temperature on the type of deformation, concave or convex, is also known, inter alia, from U.S. Pat. No. 5,721,050.

In GB 2 108 483 A, it is to this end proposed that the changes in shape be taken into account during production of the preform. However, since the effects of the change in shape are dependent on the size of the drawn parts and/or the size ratio of preform to drawn components, neutralization of the deformation effects is only achieved accurately at a specific scale ratio. To obtain reproducible results, therefore, it is also necessary for other parameters, such as tensile force and temperature, to be complied with.

SUMMARY OF THE INVENTION

The invention is based on the object of providing an inexpensive production process which can be used to produce components, such as for example spacers, with a high level of lateral positioning accuracy at low cost and in large numbers. Furthermore, restrictions on the groove shapes and groove dimensions which can be achieved with the process are to be avoided as far as possible, in order in this way to allow the use of fibers of different size within the grooves while, at the same time, holding the fibers more successfully inside the grooves.

This object is achieved, in a surprisingly simple way, by a process for shaping a body with elongate structures on its surface, for example with depressions, in which a preform is provided, at its surface, with elongate structures, such as in particular depressions, the preform which has been provided with these structures is heated at least in one region or at least in part, and the preform which has been provided with the structures, such as for example depressions, is drawn in the heated state until at least part of the preform has adopted a cross section which substantially corresponds to the desired cross-sectional shape or final cross-sectional shape.

In the case of conventional heating, the glass is to a large extent heated at the surface by absorption or convection. In this case, the volume is heated through by means of heat conduction and predominantly long-wave infrared radiation which is absorbed again after just a short distance. These mechanisms lead to a temperature gradient in the draw bulb, and/or in the heated region. This is associated with a gradient in the viscosity. This leads to nonuniform flow of the glass in the heated region and/or in the draw bulb.

In addition to the surface tension, this effect leads to deformation which is not to scale, which is to be deprecated, as described for example in GB 2 108 483 A. However, these described effects can be largely avoided if it is possible for the material which is to be drawn to be heated uniformly. According to the invention, for this purpose the preform is heated by means of a radiation source, such as in S particular with at least one infrared radiator, only a small proportion of whose radiation is absorbed during passage through the material. Accordingly, the low level of absorption leads to homogeneous heating in the volume of the body which is to be drawn. This homogeneous heating results in a very low temperature gradient and therefore only a very minor gradient in the viscosity of the glass in the draw bulb, so that the glass can be drawn uniformly without deformations being formed.

To prevent extensive absorption of the radiation in the vicinity of the surface of the body, it is possible, in particular in the case of preforms made from glass or glass-ceramic, for the spectral distribution of the radiation to be selected in such a way that the majority of the spectral power density is in the short-wave infrared region. Most glasses and glass-ceramics have an absorption edge in the long-wave infrared region. This is the reason why long-wave infrared radiation, as is emitted, for example, by the heated glass material itself, does not extend far into the material and/or why excessive absorption occurs at the surface of the material to be heated when conventional heating means with low color temperatures are used.

With regard to the uniform heating using infrared radiation, at this point reference should also be made to the earlier applications in the name of the present Applicant bearing publication numbers DE 299 05 385 U1, DE 199 38 808 A1 and WO 00/56675, the content of disclosure of which is hereby incorporated in its entirety in the subject matter of the present invention.

Of course, the radiation absorption is highly dependent on the material of the preform. Accordingly, it is also conceivable to use other radiation sources, for example in the visible region, provided that the absorption of the material in this region is sufficiently low. At any rate, the intention is for the radiation which is used for the heating to have a spectral distribution which is such that at most half the radiation power is absorbed during a single pass through the material. This value is to be understood as a mean, since the absorption is dependent not only on the material of the preform but also on the thickness of material through which it is to pass. However, this thickness changes along the heated region in the direction of drawing, on account of the reduction in cross section in this direction, and moreover is dependent on the spatial direction of the corresponding light beam.

It is particularly preferable for infrared radiation with a center of gravity of the power density in the short-wave infrared region to be used for the heating. Many glasses or glass-ceramics which can advantageously be used as material for the preform have an absorption edge at a wavelength of approximately 2.7 µm, and consequently the transparency of these materials rises greatly at wavelengths below this value. Accordingly, it is advantageous to use radiation sources which emit radiation whose spectral power density is predominantly above this value. This is achieved, for example, if the radiation source emits thermal radiation with a correspondingly high color temperature. If the absorption edge is at 2.7 µm, the condition that the spectral power density should be predominantly at shorter wavelengths is achieved with a color temperature of 1500° K. In this case, approximately 51% of the total spectral power density is distributed over shorter wavelengths. Accordingly, the absorption of the material of the preform decreases and the material is heated more uniformly if the color temperature is still higher, for example is over 2000° K. For example, in one embodiment of the invention, there is provision to use infrared quartz tube radiators which can be operated with a color temperature of approximately 2400° K. At a color temperature of 2400° K., according to Wien's displacement law the wavelength with the maximum spectral power density is at 1210 nm, i.e. well below 2.7 µm.

Furthermore, to improve the utilization of energy, it is expedient to use not just direct radiation which impinges directly from the radiation source on the region which is to be heated. Rather, the radiation power may also comprise an indirect radiation component which impinges on the region after it has been reflected and/or scattered. Radiation components which have already passed through the region to be heated without being absorbed can also in this way be directed back onto the material by being scattered or reflected and thereby contribute to heating. In this way it is possible to achieve efficient heating even when the material of the preform is highly transparent to the radiation emitted by the radiation source.

Accordingly, it is advantageous if an apparatus for carrying out the process according to the invention and/or for producing bodies according to the invention, in addition to a radiation source for heating the material to be drawn, also includes reflective elements or elements which scatter the radiation. By way of example, if infrared radiators are used, it is possible to use Quarzal wall elements which effect diffuse reflection of the infrared radiation therefrom.

The lower the proportion of the radiation power which is absorbed by the material of the preform, the more uniformly the region of the preform is heated. However, this also reduces the proportion of the total radiation power from the radiation source which is available for heating the material of the preform. For example, the radiation source may advantageously also be selected in such a way that less than 30% or even less than 10% of the radiation power is absorbed during a single pass through the material if the preform material means that particularly uniform heating is important or if the drawing device is equipped with elements of correspondingly good reflection, with the result that the radiation can be reflected or scattered back a number of times onto the preform with only slight power losses.

Of course, the heating of the material of the preform which is to be drawn can also be boosted by further heating sources, such as for example resistance heating. This may be advantageous, for example, if a temperature gradient is produced at the surface of the heated material as a result of surface cooling in relatively cold ambient air. In this case, additional heating of this type makes it possible to compensate for temperature gradients which occur at the surface.

Very surprisingly, the heating and the operation of drawing the preform in its heated state did not cause the depressions to be forced or driven out of the substrate on account of the surface tension of the viscous material. A further very surprising factor was that it was possible to reduce the size of depressions of this type by a factor of ten or even a hundred without their shape substantially being lost and with absolute lateral tolerances in shape and position being improved still further by the abovementioned reduction factor.

A substrate with a lateral tolerance of a tenth of a millimeter at the groove surfaces relative to other groove surfaces, after reduction by a factor of ten, had a lateral tolerance of just approximately one hundredth of a millimeter, and after reduction by a factor of one hundred had absolute lateral tolerances of only about one µm.

This allowed inexpensive shaping processes to be used with a high level of accuracy, i.e. good absolute tolerance values, for processing of the preform and with inexpensive materials. The drawing operation drastically increased the yield of spacers made available by the process and drove their absolute tolerance values into excellent, high-precision ranges.

A body which is producible by the process according to the invention is also distinguished by further characteristic properties compared to similar known components provided with microstructures. For example, compared to a component structured by etching, the roughness of the surface of a body producible in accordance with the invention is considerably reduced or even made virtually undetectable within the measurement methods employed. Accordingly, the optical and mechanical properties of components which can be produced in accordance with the invention are also excellent.

The cause of the high dimensional accuracy which is achieved during the drawing or redrawing of the preform in accordance with the invention, as mentioned above, is in particular the especially uniform heating, so that at most a slight temperature gradient results along a cross section in the heated region. Therefore, it is also within the scope of the invention to provide a process for shaping a body, in particular a body with elongate structures on its surface, which is distinguished by the fact that a preform is provided, at the surface, with structures which are elongate along one direction, the preform which has been provided with the structures is heated at least in one region, and the preform which has been provided with the structures is drawn in the heated state until at least part of the preform has adopted a cross section which substantially corresponds to the desired cross-sectional shape or final cross-sectional shape, with the maximum temperature difference along the cross section in the heated region being less than 0.5 C.

With such a small temperature gradient, it is possible to achieve the desired result of highly dimensionally accurate reproduction of the structures on the bodies of reduced size in particular when glasses or glass-ceramics are being drawn.

It is particularly preferable for the heating even to be carried out in such a way that the maximum temperature difference along the cross section in the heated region is less than 0.1° C.

Therefore, the invention provides an inexpensive production process which is suitable for mass production and in which both an extremely high level of precision and a virtually unrestricted choice of groove shape obtained are achieved.

On account of the excellent results achieved in shaping, new geometries, in particular for lateral spacers, are realized, which are eminently suitable for use in optical communications technology devices, in spectrometers, in optical connectors and also in optical communications technology devices, such as for example fiber-to-solid-state waveguide interfaces for the transmission of optical signals.

The preform may particularly advantageously be shaped by grinding, hot forming within a press mold which has been heated to above the melting point, by blank pressing or by hot stamping by means of a stamp which substantially represents the negative of the desired shape of the surface which is to be treated.

The melting of profiled strands onto the preform, so that the strands which have been melted onto the preform form elevated structures, is particularly suitable for the production of such elevated structures.

The appropriate viscosity for redrawing can be set, for example, by controlling the temperature of the section which is to be lengthened, with temperatures of between approximately 100° C. and 2000° C. generally being expedient, depending on the material used for the preform.

It has been possible to implement the invention with great success on glasses, such as for example Borofloat glass. In this case, it was advantageously possible for the drawing operation to be carried out on Borofloat glass at approximately 850° C.

In a particularly preferred embodiment of the invention, the preform was drawn in the heated state at a viscosity of approximately $10^8$ dPas, resulting in a reduction in cross section which substantially completely retained the original shape and, based on the ratio of the areas of the cross sections, still resulted in highly dimensionally accurate shaped bodies even in the region of 1/100 of the original cross-sectional area and even in the region of 1/10000 of the original cross-sectional area.

The drawn bodies, the length of which had been greatly increased, were cut to length and divided into individual bodies in an advantageous way by scoring and breaking. In a further advantageous embodiment, the bodies which had been cut to length and/or divided into individual bodies by scoring and breaking were face-ground at their top side in order in this way to allow them to be mechanically coupled to further modules.

The process can also advantageously be applied to plastic bodies, in particular those which comprise a thermoplastic.

A particularly preferred embodiment used a glass-ceramic which has virtually no thermal expansion in the region of room temperature. This means that in particular for the production of gratings for spectrometers, extremely stable operation of spectrometers of this type is ensured and moreover a high level of accuracy is reliably guaranteed.

Preferred forms of the depressions generally comprise grooves which extend substantially parallel to the longitudinal axis of the shaped body.

In the first preferred embodiment, the grooves comprised a substantially V-shaped cross section, which likewise comprised a V shape which was tilted about the longitudinal axis of the groove, in order in this way to provide gratings with a blazing, in which the intensity of the diffracted light was increased in at least one order of diffraction.

In alternative embodiments of the shaped body in accordance with the invention, the grooves advantageously had a substantially rectangular or trapezoidal cross section, in which, as is also the case with the V-shaped grooves and also with U-grooves, the inclination of the side walls of the grooves corresponded to an angle of inclination of the preform which can be predefined substantially as desired.

Although this is not illustrated in more detail in the figures, it is also possible to realize grooves with undercuts, provided that these undercuts can be introduced into the preform prior to drawing. During the drawing operation, these forms of grooves are likewise substantially reproduced in the same form on the shaped body obtained in accordance with the process.

In a further configuration of the invention, by way of example, a waveguide is inserted into the groove and the shaped body serves as a spacer for an arrangement of optical waveguides which can in this way be connected with a high degree of accuracy to further waveguides in a prealigned manner. These further waveguides may be formed with photolithographic accuracy in the surface of a solid body. Solid bodies of this type may be transmitters, receivers, modulators or, in general terms, optical circuits of optical communications technology systems.

In a further alternative embodiment, a transparent material which has a different refractive index than the substrate is introduced into the groove, and in this way a waveguide is advantageously defined in the groove itself.

If the shaped body is provided with a reflective coating, for example a dielectric multilayer coating, it is in this way possible to provide a reflection grating with a high degree of accuracy and which has been optimized by blazing for an order of diffraction.

Without a coating of this type, the grating can be used as a transmission grating, and in this case it is advantageous if a transparent substrate is selected and an antireflection coating is applied to the respective surface of the grating.

For light which is transmitted in the substrate, the grating formed at the surface, if it is appropriately dimensioned, can be used as a grating with distributed Bragg reflection, and light can be coupled out of or into the substrate. Coupling operations of this nature are of considerable interest, for example, for doped waveguide amplifiers, in particular waveguide amplifiers doped with rare earths. Furthermore, in a very simple embodiment of a rain sensor, it is possible for light to be introduced into the windscreen of a motor vehicle and to be coupled back out after a certain transmission distance through the motor vehicle windscreen, in which case it is possible to provide a highly accurate measurement of the transmission losses suffered in the motor vehicle windscreen as a result of drops of rain striking the windscreen.

Moreover, there is a considerable demand for extremely finely structured components which have structures on more than one side. Components which have structures on opposite sides are of particular interest. By way of example, the structure on the underside of the component can be used to align the component on a base. A further standard situation arises if a plurality of components are to be stacked on top of one another and precise orientation of the individual components is crucial.

One known method for producing parts of this type makes use of the silicon photolithography technique which is known from microelectronics fabrication and can be used to optically transfer very fine structures to a substrate by means of mask techniques; these very fine structures are then translated into larger geometric structures in etching processes. This highly accurate process entails considerable outlay, and consequently it is not suitable for the mass production of parts which are to be produced at low cost. Moreover, only a very small number of materials, such as for example silicon in single crystal form, can be processed in this way.

High costs are likewise associated with this material. In addition to the high costs, with this process it is not possible to produce structures which are precisely aligned with one another on, for example, two opposite sides of a component, since only one side is accessible for processing.

A further drawback of this process is that only structures which follow the lattice planes of the base material silicon can be produced. Therefore, there are considerable restrictions imposed on the choice of possible structures.

The LIGA process (LIGA is an abbreviation of the German "Lithographie, Galvanoformung und Abformung") has been developed for the production of microstructured components for mass production. The LIGA process can be used to produce three-dimensional parts from plastic, metal or ceramic with structures in the submicrometer range. However, the production of the masks for the LIGA process requires high-energy, brilliant X-radiation, and consequently the mask exposure generally has to be performed in a complex way using synchrotron radiation, which constitutes a considerable cost factor for mass production. Since this process likewise employs lithographic mask fabrication, once again the additional problem arises that production of components which have been structured on more than one side with microstructures which are precisely aligned with one another is not readily possible.

With the present invention, it is in a very simple way possible to produce even components which have structures in the micrometer range on more than one surface, with the structures being precisely aligned with one another.

Accordingly, the invention provides a process for producing bodies with structures which are elongate at least along one direction of the body, in which a starting body is produced, this starting body having the structures which are elongate along one direction on an enlarged scale on at least two sides, and in which the starting body is lengthened in the direction in which the structures are elongate, by the application of a force to the starting body, and the structures on the preform are reproduced on a reduced scale on a rod or ribbon.

A preform which is provided with structures which are elongate in one direction on more than one surface is deformed in this way, using the process according to the invention, by means of a redrawing process, into a continuous ribbon whose cross section corresponds, on a reduced scale, to the original cross section. Therefore, the structures which were present on the preform are reproduced in miniaturized form on the surfaces of the ribbon or rod.

The process according to the invention results, in an extremely surprisingly simple way, not only in the structures which were present on the surface of the preform being reduced to scale, but also in a corresponding reduction in the manufacturing tolerances of the preform. Therefore, the process according to the invention can be used to produce highly accurately fabricated microstructures. Moreover, the application of microstructures to more than one side also enables the structures on various sides of the components to be accurately aligned with one another. The simultaneous production of the structures on all sides of the redrawn ribbon or rod from a relatively coarsely structured preform means that the geometric position of the structures with respect to one another on, for example, the underside and top side can be produced with very narrow tolerances and in a reproducible fashion. This is not possible with the processes which have been disclosed hitherto. Moreover, with the process according to the invention it is possible, by inspecting the relatively large-scale geometric dimensions of the preform, to check the position of the structures with respect to one another with a very high degree of accuracy even before carrying out the actual process of producing the component. Very accurate monitoring of the production parameters, such as for example the temperature at which the preform is redrawn and the drawing rate, allows all the dimensions of the cross section of the preform to be reproduced on a reduced scale in the rod or ribbon produced in this way.

A further advantage of the process results if the at least two sides lie substantially opposite one another. The redrawing of preforms which have been structured on one side often leads to bulging and bending of the rod or ribbon produced, leading to unacceptable deviations in the cross-sectional profile of the rod or ribbon produced from the desired geometry. The reason for this is the asymmetric distribution of the material which is to be deformed even in the starting form, which boosts the tendency of the glass ribbon to be deformed uncontrollably. The formation of structures on a side which is substantially the opposite side from the first structured side makes it possible to counteract this tendency to be deformed. The application of the structures to at least two substantially opposite sides of the preform eliminates the tendency of the ribbon to be deformed in an uncontrolled way.

In order to deform the preform by the application of a force, it is preferable for at least a section of the starting body to be heated to a temperature at which the material can be plastically deformed. On account of the fact that the viscosity of the material of the preform is generally lower in the heated region, the lengthening of the preform then takes place in a controlled manner and substantially in the region of the heated section as a result of the force being applied.

Furthermore, in the process according to the invention it is advantageous if the preform is held in a receiving part on one side. In this case, it is preferable for the force which is used to redraw the preform to be applied to the opposite end of the preform from the receiving part.

Furthermore, it is particularly preferable for the heated region to be held in a spatially fixed position and for the preform to be advanced, so that a strand of reduced cross section can be drawn continuously.

Moreover, it is within the scope of the invention to provide an apparatus for carrying out the process according to the invention and/or for producing shaped bodies in accordance with the invention. An apparatus of this type accordingly comprises a radiation source for heating at least a region of a preform,
a receiving part for holding a preform on one side, and
a drawing apparatus for drawing the preform.

In this case, the radiation from the radiation source has a spectral distribution which is such that at most half of the radiation power is absorbed during a single pass through the material.

Furthermore, the apparatus is preferably equipped with a device for advancing the preform. This device feeds material of the preform to the heated region and/or to the draw bulb while the heated material is drawn out on the opposite side of the draw bulb by means of the drawing apparatus. In this way, the drawing apparatus draws a body according to the invention with cross-sectional dimensions which have been reduced substantially to scale from the preform.

To reduce disruption from external influences which could affect the temperature distribution in the draw bulb, it is possible for the radiation source to be arranged in a heating muffle. This arrangement, by way of example, reduces the magnitude of air flows which cool the surface of the heated region.

In particular in order to draw preforms made from glass or glass-ceramic material, it is advantageous if the radiation source comprises at least one infrared radiator, which is preferably configured in such a way that it is able to emit thermal radiation with a color temperature of more than 1500 K or more than 2000 K in order to keep the absorption in the glass or the glass-ceramic at a low level.

As has been mentioned above, it is furthermore advantageous if the apparatus comprises at least one element which reflects or scatters the radiation from the radiation source, in order to achieve a good level of efficiency during heating.

BRIEF DESCRIPTION OF THE DRAWINGS

The invention is described in more detail below on the basis of preferred embodiments and with reference to the appended figures, in which.

DETAILED DESCRIPTION OF THE INVENTION

Figure 1:
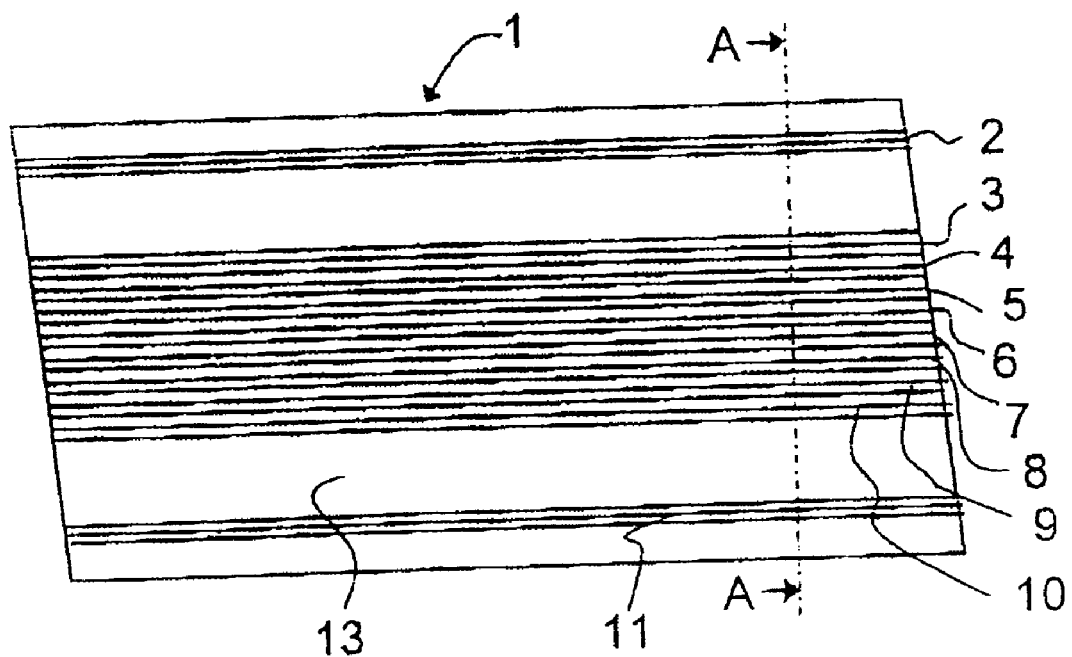
FIG. 1 shows a plan view of a preform for carrying out the process according to the invention.

The invention is described in more detail below on the basis of preferred embodiments, in which context reference will be made first of all to FIG. 1, which shows a plan view of a preform which is denoted overall by reference numeral 1 and has grooves formed therein.

In addition to the grooves 2 to 11, on the left-hand side, as illustrated in FIG. 1, there is a depression for mounting the preform in a drawing apparatus which is known to the average person skilled in the art and is not shown in more detail in the figures.

Figure 2A:
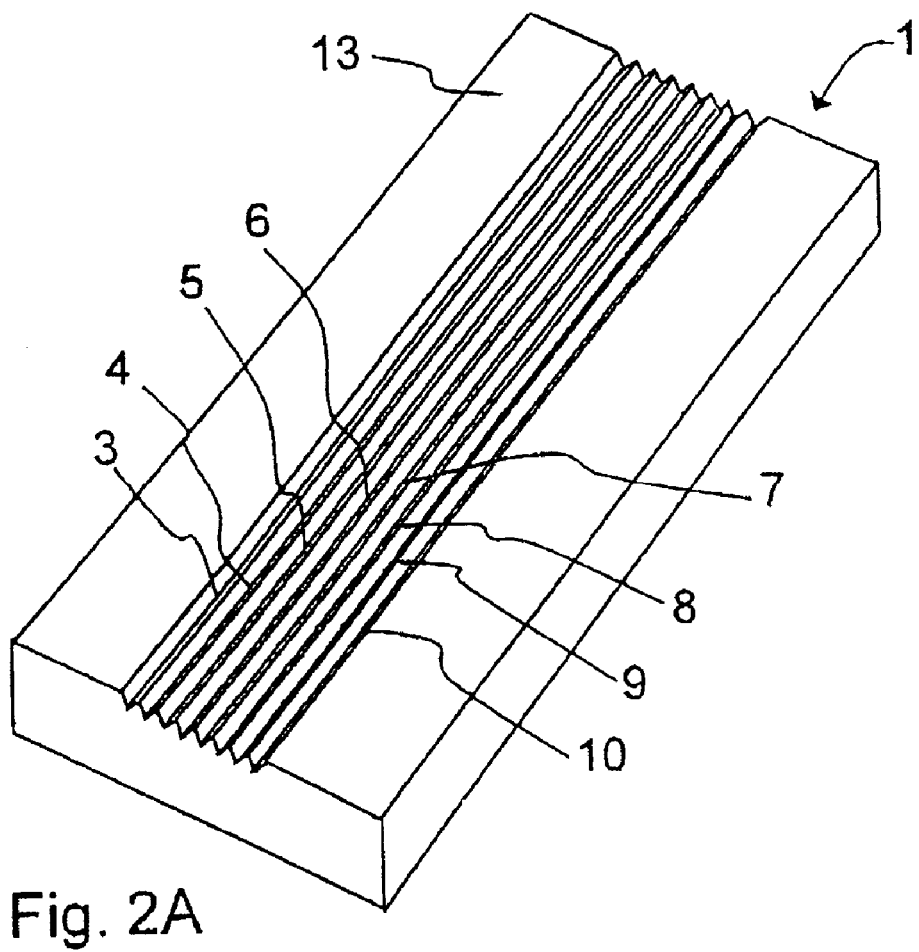
FIGS. 2A and 2B show perspective views of further preforms which are suitable for carrying out the process according to the invention.
Figure 2B:
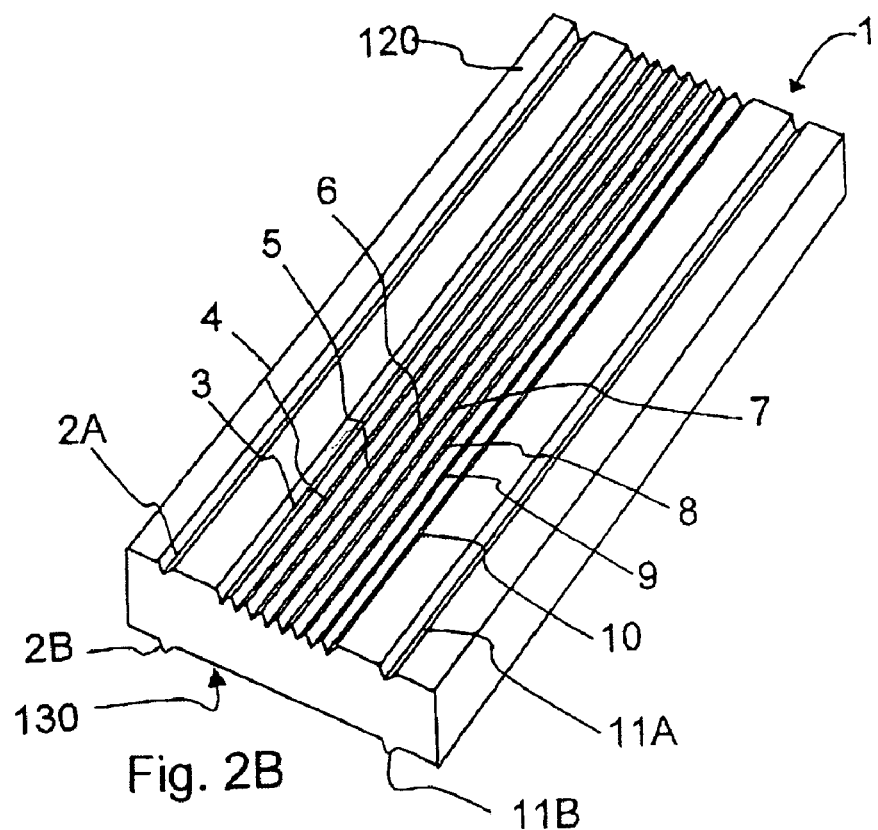

A further preform 1 according to the invention is shown in FIG. 2, in which the grooves 2 and 11 have been omitted.

FIG. 2 shows a perspective view of yet another embodiment of the preform 1. Structures 2B and 11B in the form of v-shaped elevations are arranged on the opposite side 130 from the first side 120. The structures 2B and 11B each have a cross section which is complementary to the flute-structures 2A and 11A. Furthermore, the elevations 2B and 11B are arranged at the same distance from one another as the complementary, flute-like depressions 2A and 11A. The components which are obtained from this preform by redrawing and detaching sections and have a cross section which is substantially reduced to scale, can be stacked by means of the structures 2A and 2B and 11A and 11B engaging into one another, in such a way that the first side of a first component and the second side of a further component come to bear on top of one another, with accurate positioning of the components with respect to one another transversely to the direction in which the structures extend being achieved by the fact that the microstructures engage in one another.

The grooves 3 to 10 arranged in the surface 13, with their substantially v-shaped profile, can be seen very clearly from the illustration of the preform 1 presented in FIG. 2.

Figure 4:
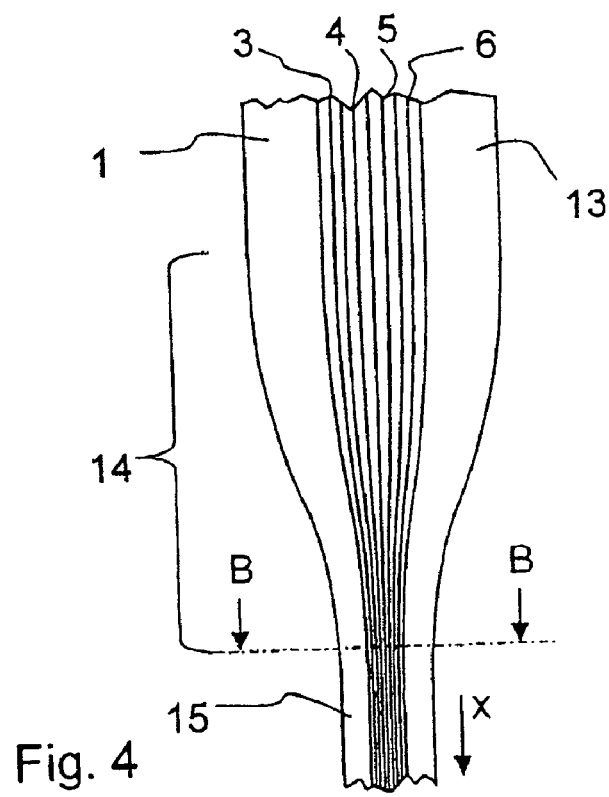
FIG. 4 shows a view of the preform during the drawing operation at the transition to the shaped body.

The following text will refer to FIG. 4, which shows the preform 1 in the at least partially heated state during the drawing operation; for the sake of simplicity, only a few depressions forming grooves 3 to 6 are illustrated.

In a heated region 14 of the preform 1, a drawing force is exerted on the preform 1 in a manner which is known per se, and in this way drawing is carried out in the direction indicated by arrow X, shaping the preform 1 to its substantially desired cross-sectional shape and/or its final cross-sectional shape, so as to form the body 15 which is to be produced using the process.

The heating can be effected by means of substantially all the heating processes which are known to the average person skilled in the art, such as for example thermal or non-thermal radiation, laminar air flows or by wrapping a heating mat around the region which is to be heated. It is preferable to use heating techniques which heat the volume of the body to be drawn homogeneously. This can be achieved, for example, by using short-wave IR radiation or microwaves. However, the heating is in particular carried out in such a way that the temperature difference along the cross section in the heated region is less than 0.5° C. or even less than 0.1° C. This means that only a minor or negligible temperature gradient results along a direction in the cross-sectional area. Consequently, differences in the viscosity within a cross-sectional area, and also in the surface tension along the boundary curve of a cross-sectional area of this type in the heated region 14 and/or the draw bulb, are very minor. Therefore, deformation, such as rounding and concave deformation of surfaces which were originally planar, can as far as possible be avoided with such minor temperature differences.

However, great care should be taken to ensure that the temperature is constant over the cross section of the heated region 14. Deviations of more than half a degree Celsius, preferably of more than a tenth of a degree Celsius should be avoided within the heated region 14, i.e. along the entire cross section.

Figure 3A:
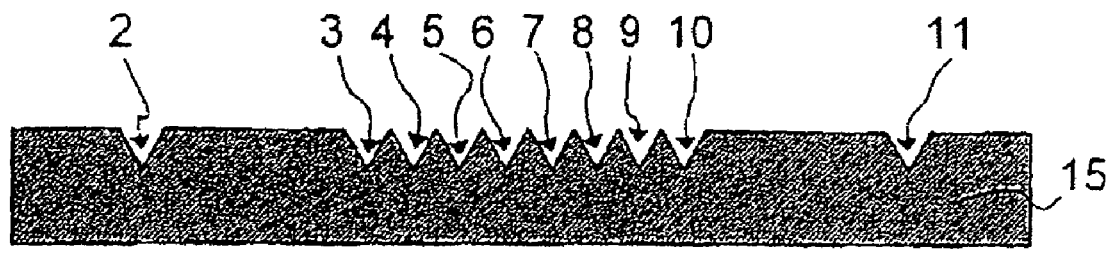
FIG. 3 shows a cross-sectional area, running along cross-sectional plane B-B, of the shaped body illustrated in FIG. 4, which substantially corresponds to the shape of the cross-sectional area of the perform illustrated in FIG. 1 running along plane A-A.
Figure 3B:
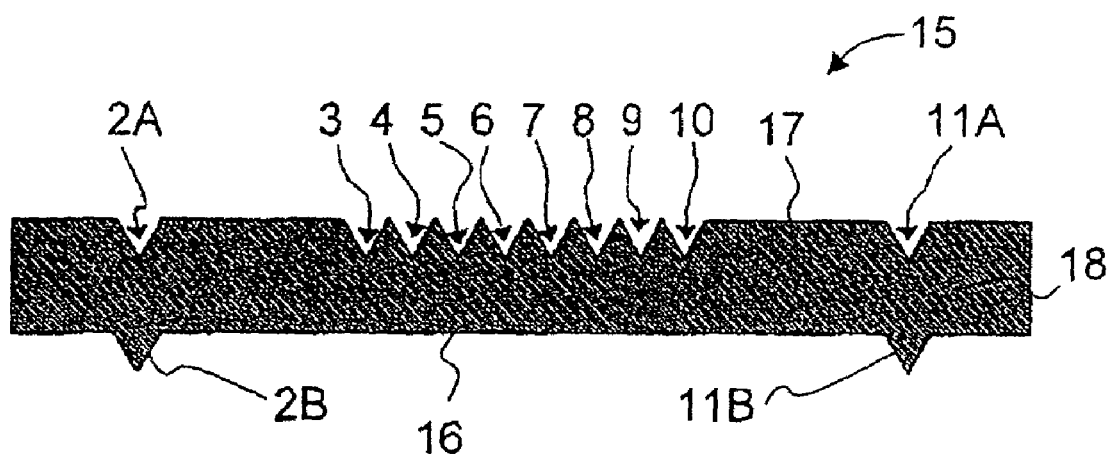

Two embodiments of bodies 15 which have been formed by the drawing operation, including their v-shaped grooves, corresponding to a reproduction of the preform 1 which is accurate in terms of shape but reduced in terms of cross section, are illustrated in FIGS. 3A and 3B.

The body shown in FIG. 3B, unlike the body shown in FIG. 3A, in addition to its v-shaped grooves 2A, 11A, 3-10, also has elevations 2B, 11B in the substrate 18 of the body 15.

A cross-sectional shape which is virtually exactly identical to the cross-sectional view along cross-sectional area B-B from FIG. 4 results along cross-sectional area A-A from FIG. 1, which is arranged in the region of the undeformed preform 1.

The preform 1 illustrated in FIGS. 1 and 2 is shaped on its surface 13 prior to the heating and drawing, by means of grinding, hot forming inside a press mold, by blank pressing or by hot stamping by means of a stamp which substantially represents the negative of the desired shape of the surface which is to be treated.

Furthermore, in accordance with the invention, it is possible to use any further shaping process available to the person skilled in the art, such as for example photolithographic or etching processes, for this shaping operation, provided that processes of this type are not inappropriate for cost reasons.

After its surface has been processed, the preform 1 is clamped in a drawing apparatus (not shown in the figures) and heated, in its region 14, to a temperature of approximately 100° C. to 2000° C.

In the case of Borofloat glass, the temperature used for the heated region in accordance with the process is approximately 850° C.

The intention of the heat treatment is to ensure that the preform, in its heated region, will adopt a viscosity which is in a range from approximately $10^5$ dPas to $10^{10}$ dPas. In this context, a viscosity of $10^8$ dPas is particularly preferred.

After the drawing operation, the drawn body 15 can be cooled slowly and uniformly over its cross section, so that it is restored to its original strength.

In a particularly preferred embodiment, the shaped body is then scored transversely to the drawing direction X on its side 16, which will be referred to below as the underside, in order for it to be broken at desired lengths and thereby divided into individual pieces.

Furthermore, it is within the scope of the invention for the individual pieces to be formed by sawing, laser cutting or by other suitable mechanical processes.

If the parting process leaves behind a rough surface at the parting, this roughness is reduced by end-side face grinding to the desired residual roughness values. Grinding processes of this type are well known to the person skilled in this field.

In addition to Borofloat glass, other glass, and in particular quartz glass, is also used in the context of the invention.

In a further, particularly preferred embodiment, the preform 1 comprises a glass-ceramic with a temperature range within which this glass-ceramic undergoes scarcely any thermal expansion, or a glass which, after shaping, can be converted into a glass-ceramic, with a temperature range within which this glass-ceramic undergoes scarcely any thermal expansion.

In a further configuration of the invention, the preform 1 and the drawn body 15 comprise a thermoplastic which, by being heated, can likewise adopt the viscosity values described above.

Figure 5:
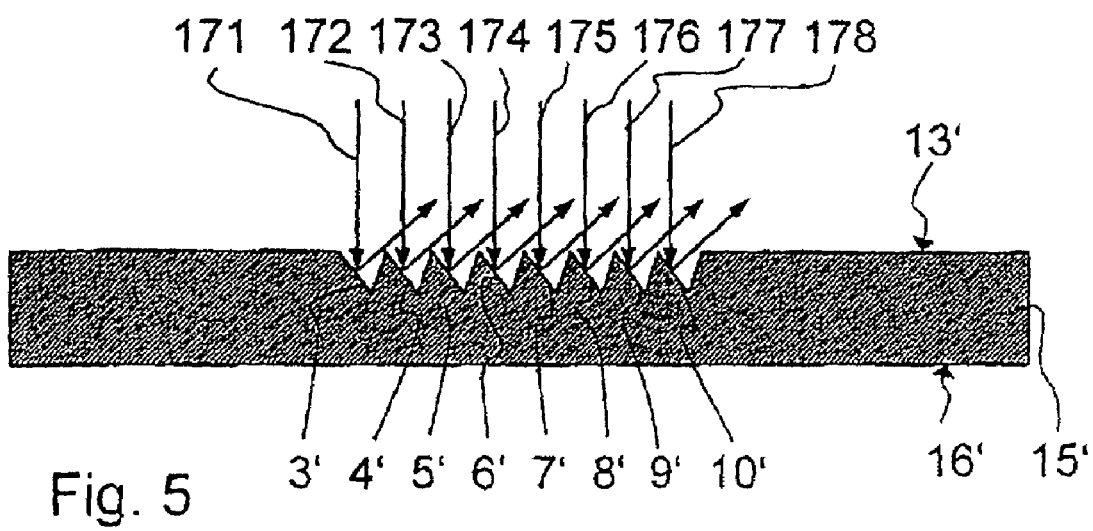
FIG. 5 shows a cross-sectional profile, obtained by drawing the preform, of a substrate whose dimensions have been greatly reduced by the drawing operation and which has a groove shape which has been modified with respect to FIG. 3, making the shaped body suitable for use as a blazed grating.

The following text will refer to FIG. 5, in which the grooves 3' to 10' are arranged asymmetrically, and/or have a v-shaped cross section, in which the v is tilted laterally in relation to the longitudinal axis of the body 15'.

This results in a grating which is known as a blazed grating and in which light, which is illustrated by way of example by the phase front vectors 171 to 178, is reflected and diffracted, with an increased light intensity being made available for a specific order of diffraction. The angles of the side walls of the grooves 3' to 10' which are required for this purpose are well known to the person skilled in the art.

The grating illustrated in FIG. 5 may be provided at its top surface 13' with a reflective metallic or dielectric coating, so that the reflectivity of the top surface 13' is greatly increased.

If the invention is intended to provide a transmission grating, it is advantageous for antireflection coatings to be arranged on the top surface 13' and the underside 16' of the shaped body 15', instead of the reflective layer on the top surface 13'.

Figure 6:
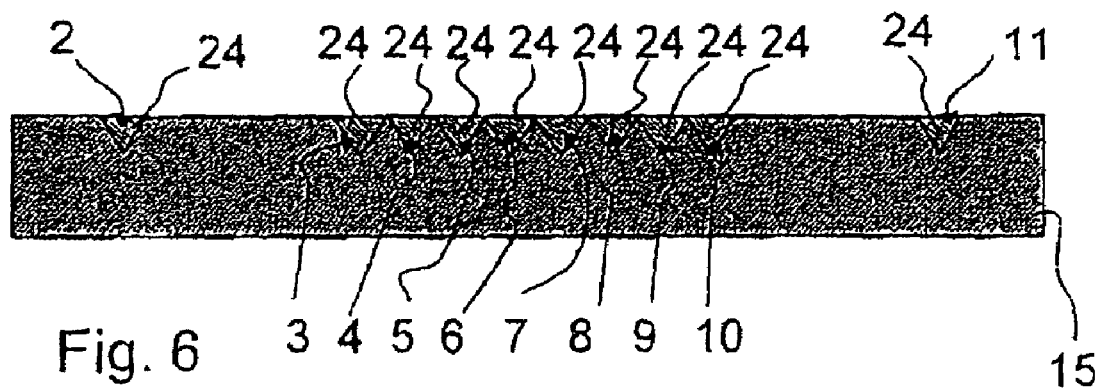
FIG. 6 shows a cross-sectional profile, obtained by drawing the preform, of a substrate whose dimensions have been greatly reduced by the drawing operation and in which the grooves are filled with a transparent further material.

The following text refers to FIG. 6, which shows a cross-sectional illustration through the body 15 shown in FIG. 3, but with filled grooves 2 to 11.

A further material, preferably a glass 24 or a plastic, which has a different refractive index than the substrate of the shaped body 15, is arranged in the grooves 2 to 11.

Figure 13:
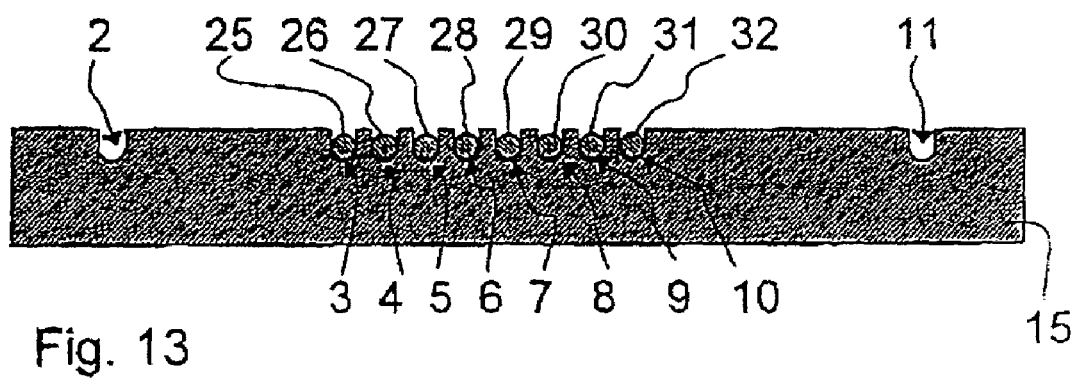
FIG. 13 shows a shaped body in which optical waveguides are arranged.

As a result, waveguides are defined inside the grooves 2 to 11, which waveguides are used, for example, as a continuation of the waveguides shown in FIG. 13, in a shaped body 15 with U-shaped grooves 3 to 10, which allows a simple transition to be made to further solid-state waveguides if the shaped body 15 shown in FIG. 6 is connected to the further solid-state waveguides.

Figure 7:
FIG. 7 shows a further embodiment of the shaped body with very rounded edges of the v-shaped grooves.
Figure 8:
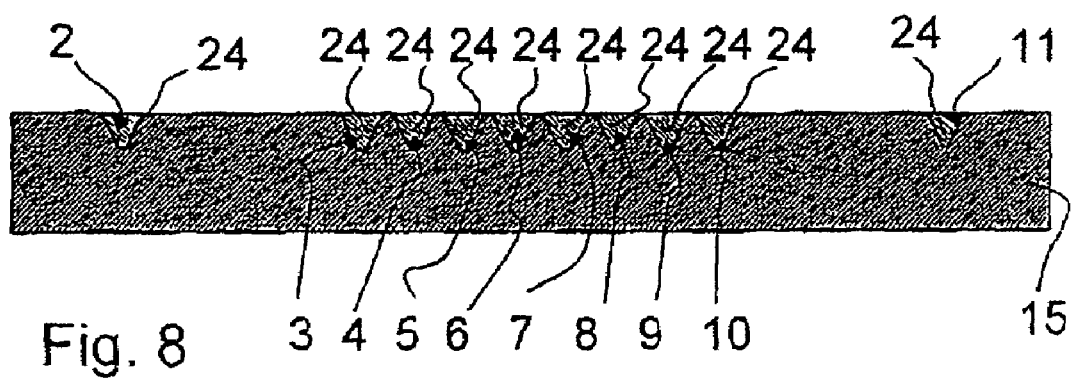
FIG. 8 shows the embodiment of the shaped body illustrated in FIG. 7, in which the grooves are filled with a transparent further material.

In an alternative configuration to the grooves illustrated in FIGS. 3 and 6, it is possible for both the preform 1 and the shaped body 15 to have rounded edges, as shown in FIGS. 7 and 8.

Figure 11:
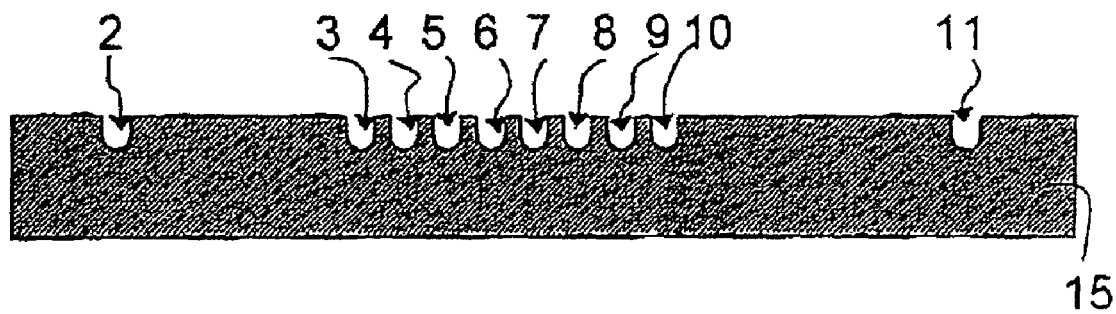
FIG. 11 shows yet another embodiment of the invention, with substantially u-shaped grooves.
Figure 12:
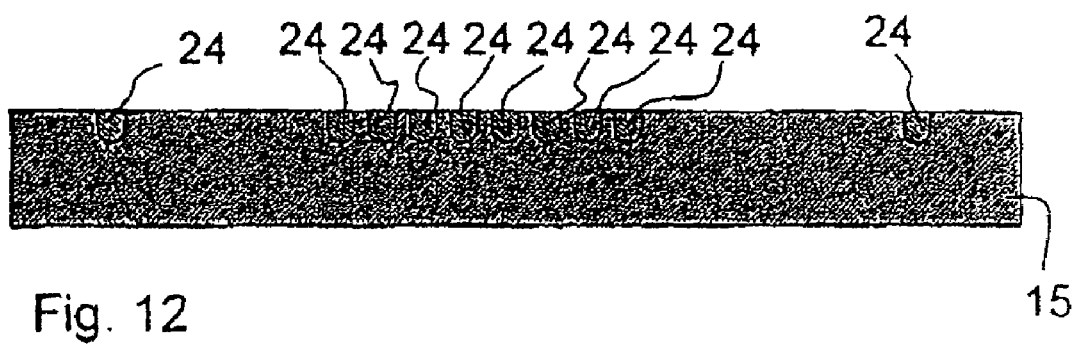
FIG. 12 shows the further embodiment of the invention illustrated in FIG. 11 with substantially u-shaped grooves, in which the grooves are filled with a transparent further material.

In a further configuration of the invention, shaped bodies 15 into which U-shaped grooves 2 to 11 have been formed are illustrated in FIGS. 11, 12 and 13.

In accordance with the illustration presented in FIG. 12, the grooves 2 to 11 are filled with the further material 24, a glass with a different refractive index than the shaped body 15.

As an alternative to the further glass 24, it is also possible to use plastics, in particular thermoplastics. Further materials of this type may already have been introduced into the preform and, if they have similar thermal properties to the preform 1, can also be deformed by drawing.

As an alternative, the further material 24, if its thermal behavior differs from that of the preform 1, can be introduced hot into a cooled shaped body 15, or in the case of plastic can be introduced in softened form and can be allowed to set in the grooves 3 to 10 by solvent evaporation, polymerization or in other ways which are known to the person skilled in the art.

In the cross-sectional illustration of the shaped body 15 shown in FIG. 13, waveguides 25 to 32 in the u-shaped grooves 3 to 10 are held in close contact with the side and bottom surfaces of the grooves 3 to 10.

If the grooves 3 to 10 are dimensioned accordingly, it is possible to provide a reliable press fit for the optical waveguides 25 to 32 without, however, stress-induced birefringence losses occurring in the waveguides, since the high precision of the dimensions of the grooves 3 to 10 and of the accuracy of the external dimensions of the elastic cladding of the optical waveguides 25 to 32 means that certain limit values for the forces applied are reliably not exceeded.

Figure 18:
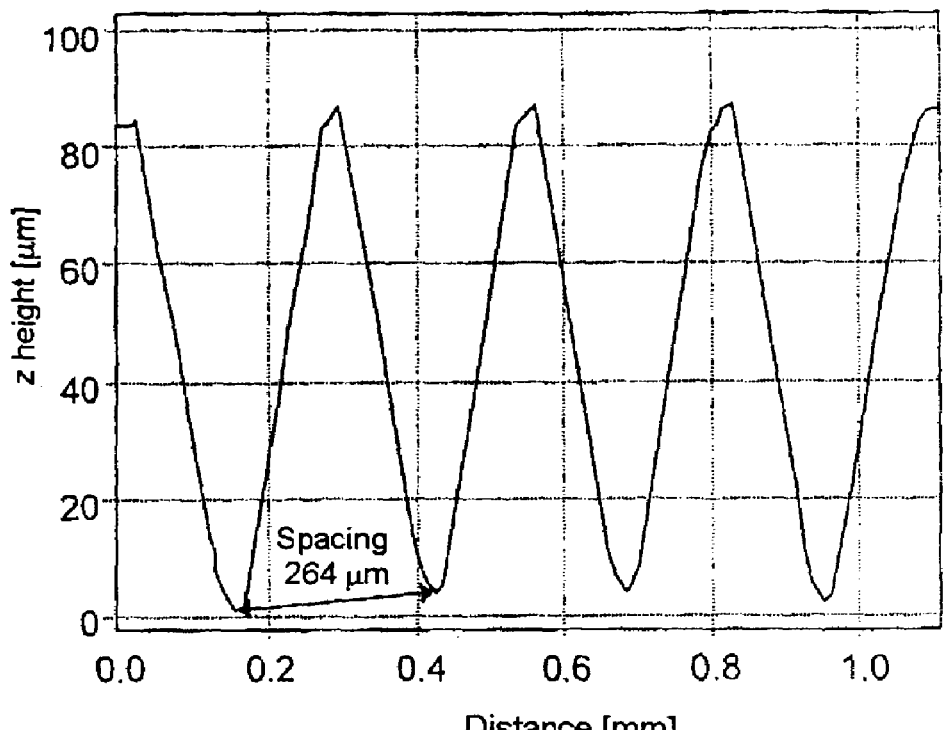
FIG. 18 illustrates the measured actual cross-sectional shape of a body produced in accordance with the invention.

To be able to measure the accuracy with which the shape is maintained, FIG. 18 illustrates measurement results which reproduce the shape of the drawn body 15.

In the embodiment illustrated in FIG. 18, the reduction in cross-sectional area was 1:100, but according to the invention it may amount to up to 1:100 000 or more.

The preform had a precisely v-shaped cross section with extremely minor changes in shape only in the regions of the points, i.e. at the bottom and at the highest location of the grooves. The extent of these changes in shape is immediately apparent from the curve measured on a Borofloat glass shown in FIG. 14.

Figure 9:
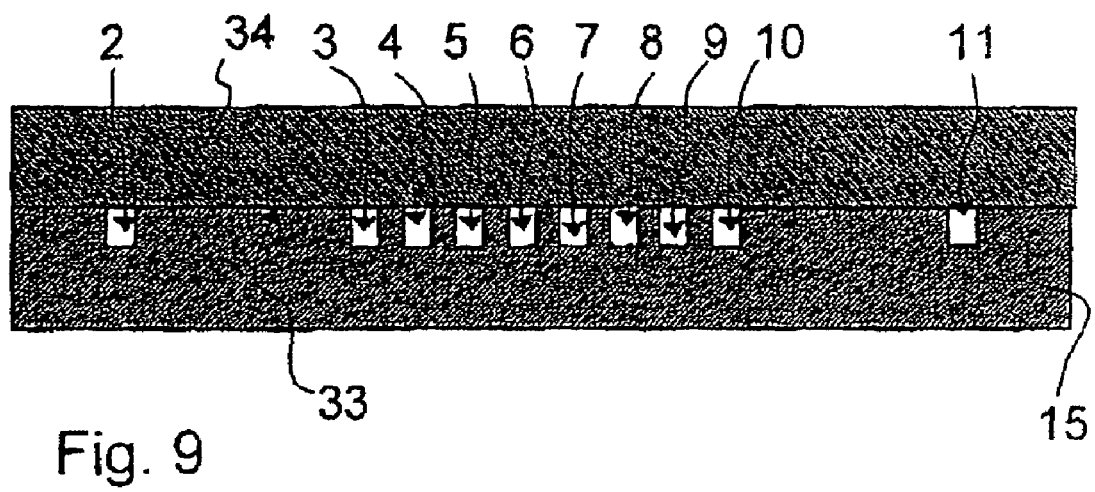
FIG. 9 shows yet another embodiment of the invention, with substantially rectangular, preferably square grooves, in which at least the grooves are covered with a further substrate.
Figure 10:
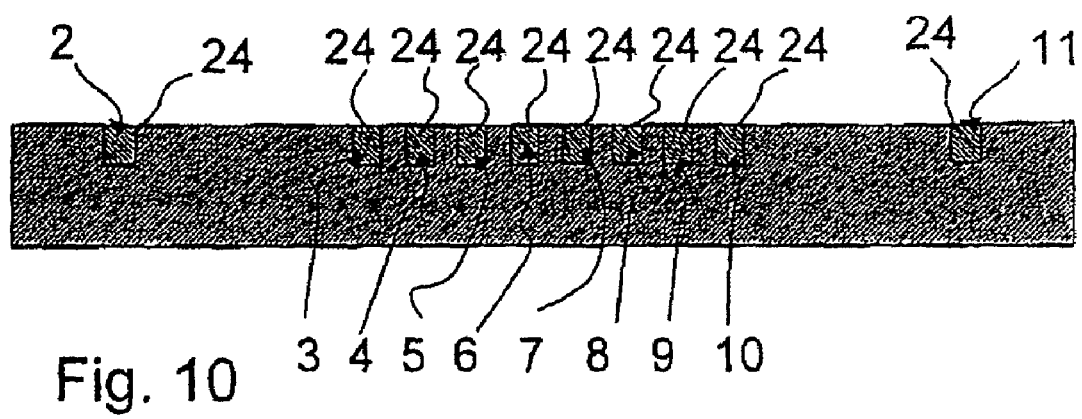
FIG. 10 shows the cross-sectional profile illustrated in FIG. 7 with filled grooves but without the further substrate shown in FIG. 9.

Finally, a further embodiment of the invention will also be referred to, which is illustrated in FIG. 9 and in which the inner walls of substantially rectangular grooves 2 to 11 are mirrored. Moreover, the underside 33 of a substrate 14 which is arranged on the shaped body 15 is mirrored. As a result, the grooves 2 to 11 provide hollow waveguides which are likewise suitable for the transmission of optical signals.

Furthermore, it is within the scope of the invention for mirrored grooves 2 to 11 of this type to be filled with the further material 24 in order in this way to form optical waveguides.

Although grooves with substantially vertical side walls have been illustrated in FIGS. 9 to 13, the invention is not restricted to this particular embodiment. Rather, it is within the scope of the invention for these side walls to be arranged at virtually any desired angle, with the result that in particular trapezoidal groove geometries can also be realized.

Figure 14:
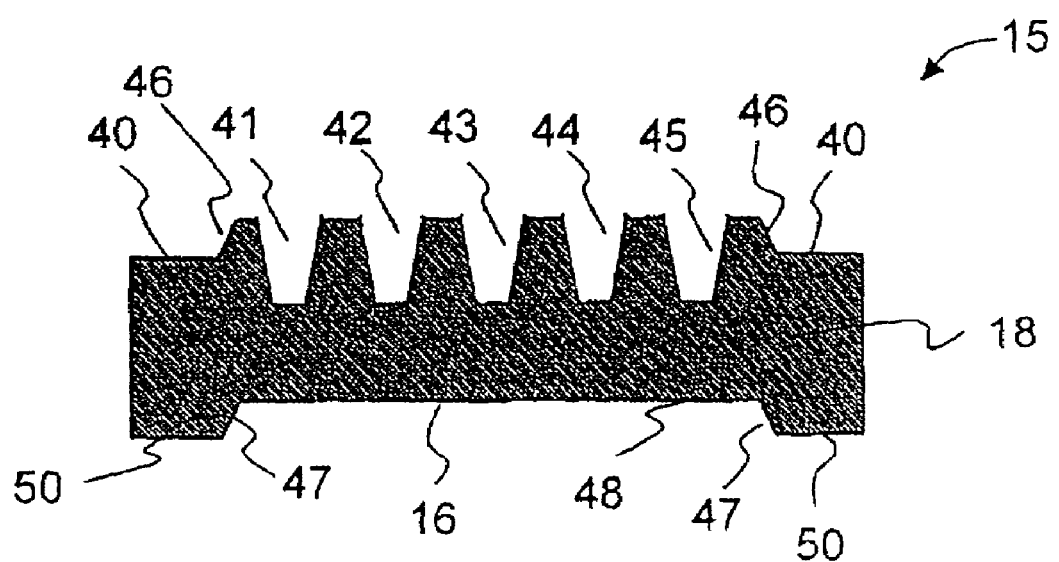
FIG. 14 shows a cross-sectional profile through an embodiment of a component which is obtained by drawing the preform and the dimensions of which have been greatly reduced compared to the preform as a result of the drawing operation.

The following text will refer to FIG. 14, which shows a cross-sectional profile, obtained by drawing of the preform 1, of an embodiment of a component or shaped body 15 whose dimensions have been greatly reduced compared to the preform as a result of the drawing operation.

In the substrate 18, passage structures 41-45, which in this embodiment have a trapezoidal cross section, extend along the length of the component 15. The form of the other surfaces allows a plurality of components to be arranged on top of one another such that they fit accurately together. In this arrangement, the surfaces 40 of the side 17, which is referred to below as the top side, come to bear on the surfaces 50 of the underside 16, with lateral orientation being ensured by means of the flanks 47, which come into contact with the flanks 46 below. The surface 48 closes off the passage structures 41-45 of the component located below.

Figure 15:
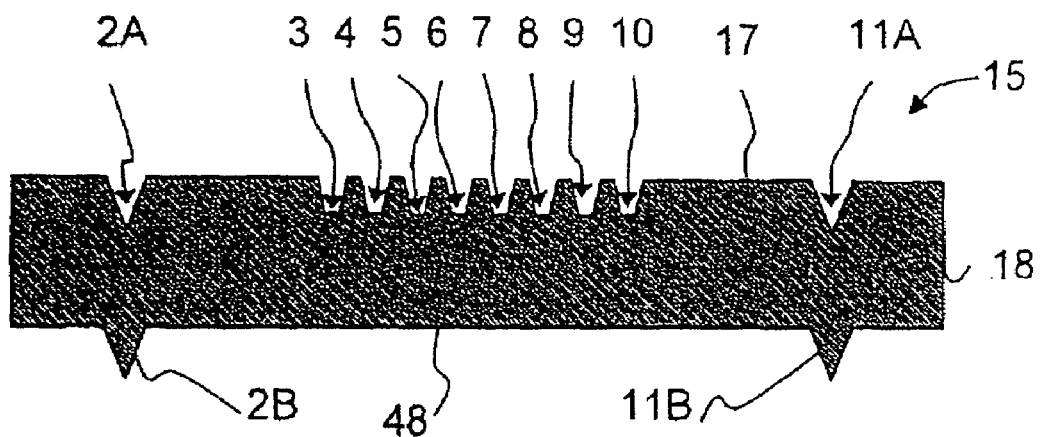
FIG. 15 shows a cross-sectional profile through a further embodiment of a component with trapezoidal passage structures which has been obtained by drawing the preform.

FIG. 15 shows a cross-sectional profile, obtained by drawing the preform, of a further embodiment of a component or shaped body 15 whose dimensions have been greatly reduced compared to the preform as a result of the drawing operation. This embodiment has a cross section which is similar to that of the embodiment shown in FIG. 3B, except that the side 17, in addition to the v-shaped structures 2A and 11A, has trapezoidal passage structures 3-10. In this case, the projections 2B and 11B on the underside, which engage in corresponding flutes 2A and 11A on the top side of an identical body 15 beneath it, ensure that a plurality of components 15 can be stacked on top of one another in such a manner that they fit accurately together. In this case, once again, the trapezoidal passage structures 3-10 are closed off by the side 48 of the part 15 located above.

Figure 16:
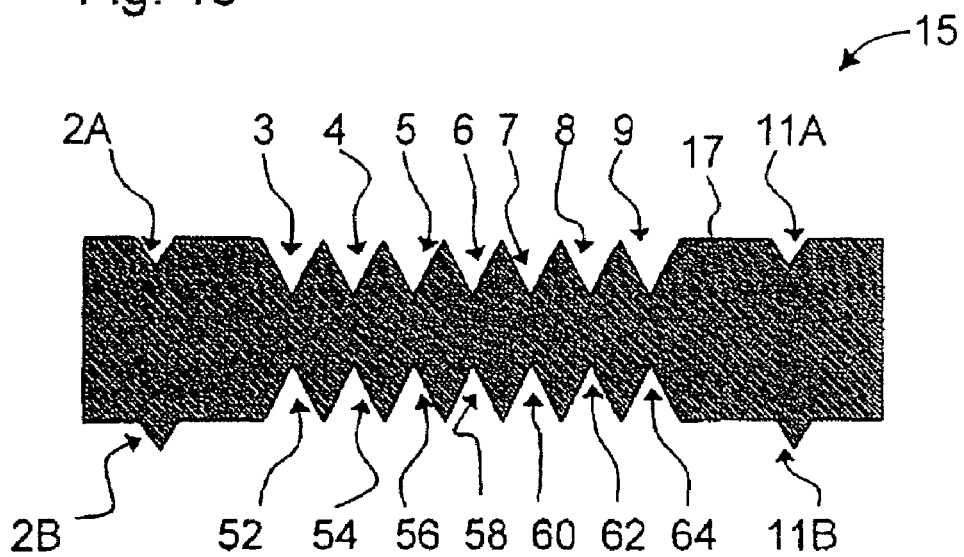
FIG. 16 shows a cross-sectional profile through yet another embodiment of a component with flute structures which complement one another on opposite sides.

FIG. 16 likewise shows a cross section through a component which has been produced in accordance with the invention. In this case, the v-shaped flute structures 52, 54, 56, 58, 60, 62 and 64 on one side of a component complement the v-shaped flute structures 3-9 on a further, substantially opposite side of an identical component 15 arranged above, with the structures 3-9 and 52-64 of the stacked components 15 together forming passages with a diamond-shaped or square cross section. In this case too, the projections 2B, 11B and the corresponding flutes 2A, 11A allow the components 15 to be stacked in an accurately fitting manner.

Figure 17:
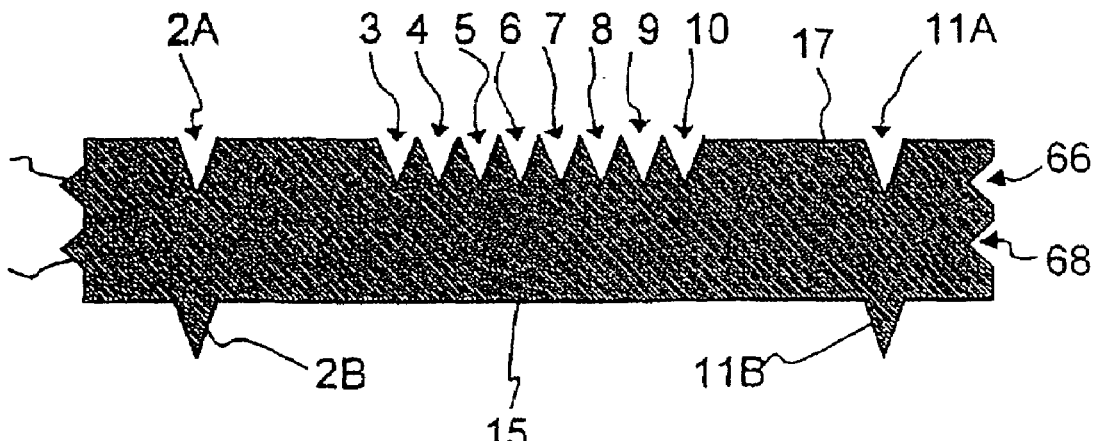
FIG. 17 shows a cross-sectional profile through yet another embodiment of a component, which has uniaxial structures not only on the top side and underside but also on the lateral surfaces.

The following text refers to FIG. 17, which illustrates a cross section through yet another embodiment of a component or shaped body 15 which has been produced using the process according to the invention. In addition to the top side 17 and underside 16, the lateral surfaces are also provided with uniaxial, elongate structures 66, 68, 70, 72. The flute structures 3-10 on the top side are used, for example, for local fixing of optical waveguides. The structures 2B and 11B on the underside allow very accurate fixing of the component on a base which is not shown and has corresponding recesses. It is likewise possible for a plurality of these components to be placed on top of one another in an accurately fitting manner, with the structures 2B, 11B and 2A, 2B meshing with one another. The uniaxial, elongate structures on the side faces of the component 15 represent elevations 70, 72 and recesses 66, 68. A plurality of identical components 15 can also be positioned very accurately next to one another by means of the elevations 70, 72 and recesses 66, 68 on the lateral surfaces. Of course, in addition to the angular structures illustrated, it is also possible to use structures with perpendicular walls or round cross-sectional shapes.

Of course, it is not only identical shaped bodies 15 in accordance with the invention which can be stacked on top of or next to one another. Rather, it is also possible for components with different structures to be combined with one another, provided that they also have complementary structures for aligning them with respect to one another.

Figure 19:
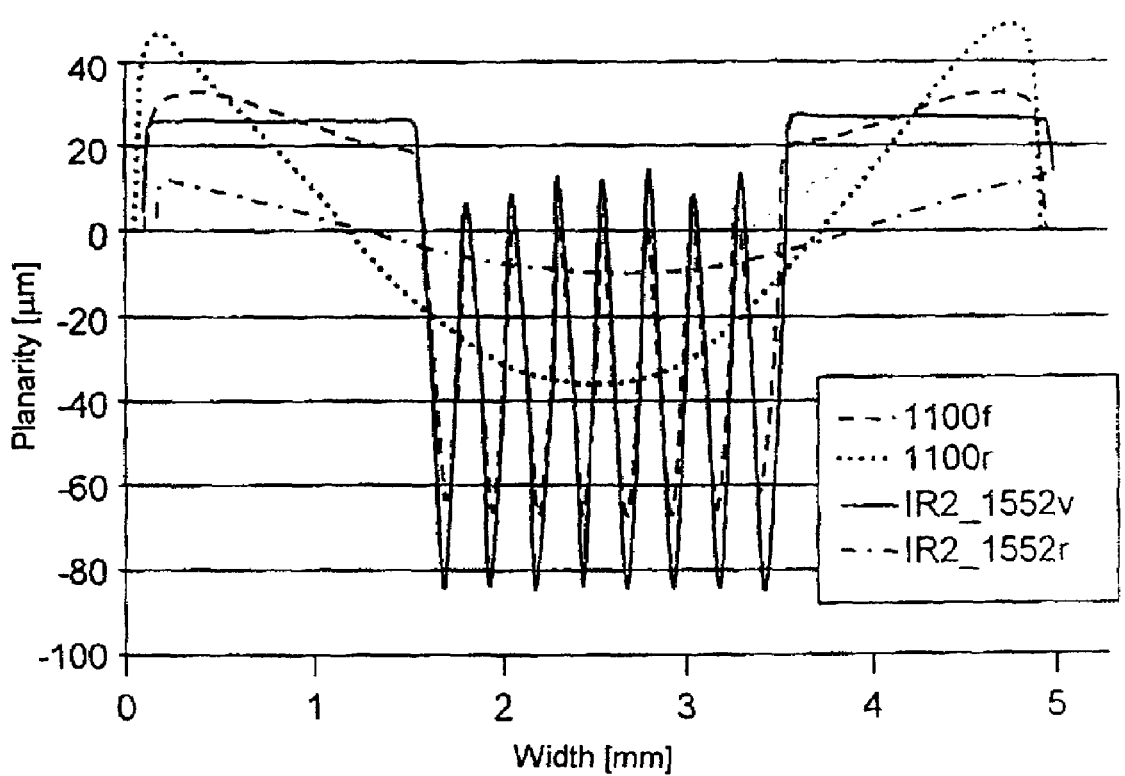
FIG. 19 shows a comparison of the planarity of a body which has been drawn in accordance with the invention using short-wave infrared radiation with a body which has been heated by means of conventional resistance heating and drawn.

FIG. 19 shows a comparison of the planarity of a body which has been drawn in accordance with the invention using short-wave infrared radiation with a body which has been heated by means of conventional resistance heating and drawn. In this figure, the curves denoted by "1100*f*" and "1100*r*" show the measured values taken from the conventionally heated body at the structured front side and at the rear side, which is not provided with structures, respectively. Accordingly, the curve denoted by "IR2_1552" shows the planarity of the structured front side of a body which has been drawn by heating using short-wave infrared radiation, and the curve denoted by "IR2_1552" denotes the planarity of the rear side of this body. The cross-sectional shape of these bodies substantially corresponds to that of the embodiment shown in FIG. 3A, without the v-shaped grooves 2 and 11. The measured values were taken along a direction which is substantially perpendicular to the drawing direction used during production, and consequently they represent the cross-sectional profile perpendicular to the drawing direction.

For both the measured bodies, a preform with a length of approximately 0.6 meter, made from Borofloat glass, designation Borofloat 40, was provided with eight v-shaped depressions by grinding. The width of the preform was 48 millimeters, and its thickness was 11.5 millimeters. The sides and grooves or depressions are dimensionally accurate to better than 5 micrometers.

To produce the body drawn by conventional heating, the preform was clamped in place in such a way that its bottom end projects into a heating muffle equipped with conventional resistance heating. The heating muffle was then heated to 850° C. After the glass had softened, it was drawn down at a rate of 270 millimeters/minute, and the preform was advanced at a rate of 3 millimeters/minute. The drawn product was then divided into individual pieces and then analyzed using a measurement probe.

The body produced in accordance with the invention was produced in the same way, except that a heating muffle equipped with three short-wave infrared radiators was used for heating instead of the heating muffle equipped with conventional resistance heating. As can be seen from the graph shown in FIG. 19, the body which has been drawn by means of short-wave infrared radiation has considerably better dimensional accuracy than the body produced by conventional heating. For example, the edges of the v-shaped grooves in the body produced in accordance with the invention are subject to less rounding, which manifests itself in a greater depth of the grooves compared to the other body.

The measured values taken on the rear side of the bodies, from the curves denoted by "1100*r*" and "IR2_1552*r*" in FIG. 19, also show that the bodies produced in accordance with the invention are less susceptible to the undesired effect known as "dog-boning". This effect leads to concave deformation of planar surfaces, so that a rectangular preform, when it is drawn, starts to resemble a body with a cross section shaped like a dog's bone.

Figure 20:
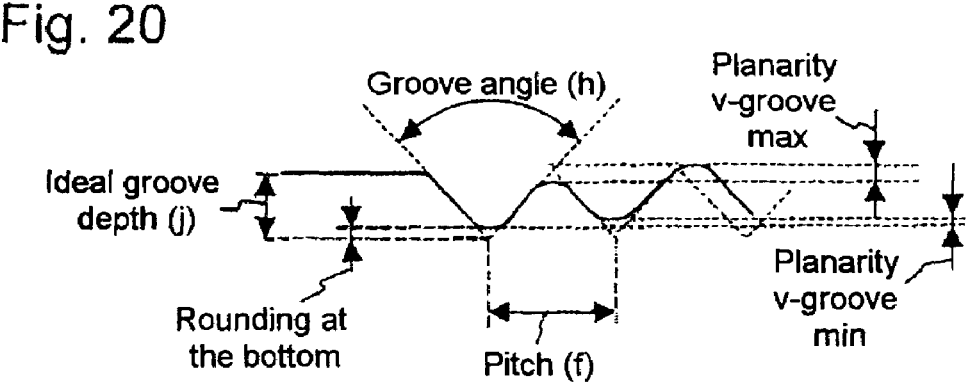
FIG. 20 shows an illustration of geometric measurement variables for quantifying the possible deformations which may occur during drawing of bodies.

The table which follows provides a quantitative comparison; the variables listed "planarity v-groove max" and "planarity v-groove min" are explained in FIG. 20. The deviations listed in the table are given in micrometers:

| Parameter | Conventional heating | Short-wave infrared heating |
| --- | --- | --- |
| Planarity of the front side | 16.31 | 7.53 |
| Planarity of the rear side | 87.83 | 24.01 |
| Planarity v-groove max | 5.29 | 8.89 |
| Planarity v-groove min | 4.99 | 1.97 |

Figure 21:
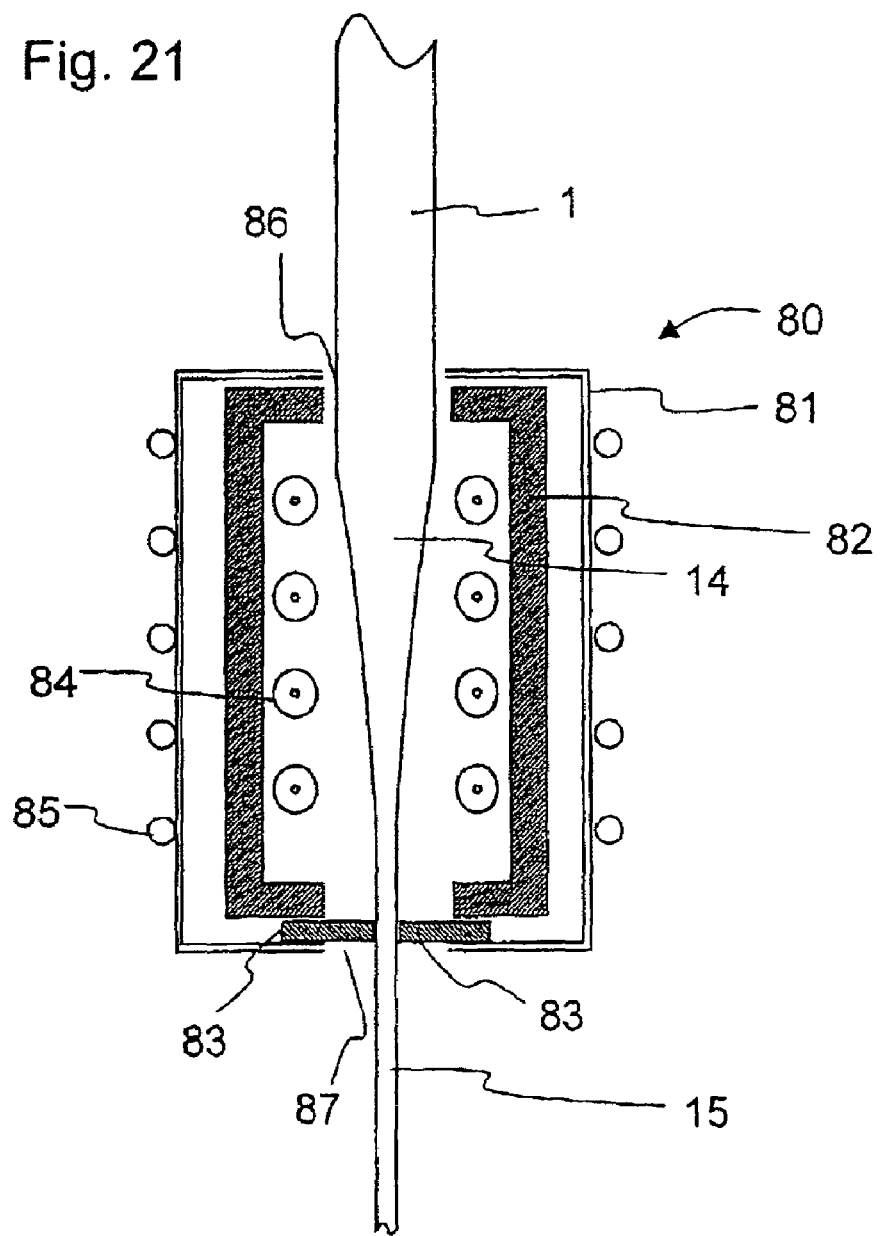
FIG. 21 shows a diagrammatic cross section through a heating muffle for heating the draw bulb using short-wave infrared radiation.

FIG. 21 shows an exemplary embodiment of a heating muffle for heating the draw bulb or the heated region 14 as illustrated in FIG. 4 for the purpose of heating by means of short-wave infrared radiation.

The heating muffle, which is denoted overall by 80, comprises a Quarzal cylinder 82, which may be produced, for example, from two half-shells. The Quarzal cylinder acts as a diffuse reflector and therefore as an element which scatters or reflects the radiation from the radiation source, so that the radiation which has not been absorbed during passage through the workpiece and/or the heated region 14 can be reflected back onto the workpiece and can then pass through the material which is to be heated a further time.

Of course, it is also possible, however, for the heating muffle to comprise other forms of reflectors. By way of example, the heating muffle may have mirrored surfaces.

Moreover, the heating muffle 80 has a housing 81 which is equipped with cooling tubes 85 for water cooling. The outlet opening 87 of the muffle 80 can be closed off, apart from a small opening for the drawn body 15, after drawing of the preform by means of two displaceable Quarzal parts 83. This minimizes a disruptive stack effect which could influence the temperature distribution in the draw bulb 14 and could thereby lead to undesired deformation of the drawn body 15.

Infrared radiators 84, the emitted radiation of which has a spectral distribution which is such that the material of the preform which is to be heated is transparent to at least 50% of the emitted radiation power, are installed in the Quarzal cylinder 82, so that at most 50% of the radiation power is absorbed during a single pass through the material. The individual radiators 84 can be actuated individually, allowing targeted influence to be exerted on the expansion and temperature distribution of the draw bulb 14. For preforms made from glass or glass-ceramic, it is preferable to use infrared quartz tube radiators which can be operated with a color temperature of approximately 2400° K., so that particularly uniform heating can be achieved as a result of the low absorption of preform materials of this type for thermal radiation with a color temperature of this nature.

In FIG. 21, moreover, bores (not shown) for accommodating the radiators or for thermocouples may also be present in the Quarzal cylinder 82. Further bores may be formed in the Quarzal cylinder 82 for measuring the glass temperature by pyrometer.

The heating muffle is preferably arranged in a spatially fixed position as part of a drawing apparatus. In operation, the draw bulb 14 therefore likewise remains in a spatially fixed position in the inner region of the stationary heating muffle, and the preform is advanced at a rate which results from the draw rate and the size reduction factor.

| List of reference symbols | |
|---|---|
| 1 | Preform |
| 2-11, 2A, 11A, 52, 54, 56, 58, 60, 62, 64 | Groove, depression, flute structure |
| 2B, 11B | Elevations |
| 120 | First side of 1 |
| 130 | Second side of 1 |
| 13 | Surface of 1 |
| 14 | Heated region of 1, draw bulb |
| 15 | Shaped body |
| 16 | Underside of the shaped body |
| 17 | Top side of the shaped body |
| 171-178 | Phase front vector |
| 18 | Substrate of the shaped body |
| 24 | Further glass, further material |
| 25-32 | Waveguide |
| 33 | Underside of the upper substrate 34 |
| 34 | Upper substrate |
| 40, 50 | Surfaces, bearing surfaces |
| 41-45 | Passage structures |
| 46, 47 | Flanks |
| 48 | Closure surface |
| 66, 68 | Recesses on side face |
| 70, 72 | Elevations on side face |

-continued

| List of reference symbols | |
|---|---|
| 80 | Heating muffle |
| 81 | Housing of 80 |
| 82 | Quarzal cylinder |
| 83 | Displaceable Quarzal parts |
| 84 | Infrared radiators |
| 85 | Cooling tubes |

The invention claimed is:

1. A process for shaping a body with elongate structures on its surface, comprising:

providing a preform having the elongate structure, the elongate structures being elongate along one direction;

heating the preform in at least one region by radiation which has a spectral distribution such that at most half of a radiation power is absorbed during a single pass through the preform, whereby radiation is impinged on the at least one region after it has been reflected or scattered and whereby radiation components which have already passed through the at least one region to be heated without being absorbed are directed back onto the preform by being scattered or reflected and thereby contribute to heating, whereby a maximum temperature difference along a region cross section in the at least one region being less than 0.5° C. is effected; and drawing the preform until at least part of the preform has adopted a cross section which substantially corresponds to a final cross-sectional shape of the body, the preform being drawn at a viscosity in the range from approximately $10^5$ dPas to $10^{10}$ dPas.

2. The process as claimed in claim 1, wherein less than 30% of the radiation power is absorbed during the single pass.

3. The process as claimed in claim 1, wherein the radiation power comprises infrared radiation with a center of gravity of the power density in the short-wave infrared region.

4. The process as claimed in claim 1, wherein the radiation power comprises thermal radiation with a color temperature of more than 1500° K.

5. The process as claimed in claim 1, wherein the preform further comprises a plurality of depressions.

6. The process as claimed in claim 1, further comprising shaping the surface of the preform by at least one process selected from the group consisting of grinding, hot forming inside a press mold, blank pressing, hot stamping by means of a stamp which substantially represents a negative of the desired shape of the surface which is to be treated, and melting of at least one profiled strand.

7. The process as claimed in claim 1, wherein the preform is drawn at a temperature in the range from approximately 100° C. to 2000° C.

8. The process as claimed in claim 7, wherein the temperature is approximately 850° C.

9. The process as claimed in claim 1, wherein the viscosity is approximately $10^8$ dPas.

10. The process as claimed in claim 1, further comprising dividing the preform into individual bodies by scoring and breaking.

11. The process as claimed in claim 10, wherein the individual bodies are face-ground on their surface.

12. The process as claimed in claim 1, wherein the preform comprises a Borofloat glass or a quartz glass.

13. The process as claimed in claim 1, wherein the preform comprises a glass-ceramic having a temperature range within which the glass-ceramic undergoes virtually no thermal expansion.

14. The process as claimed in claim 1, wherein the preform comprises thermoplastic.

15. The process as claimed in claim 1, wherein the preform comprises the elongate structures on at least two sides.

16. The process as claimed in claim 15, wherein the at least two sides are substantially opposite sides.

17. The process as claimed in claim 1, wherein the preform has an initial cross-sectional shape that is a precise, enlarged reproduction of the final cross-sectional shape.

18. The process as claimed in claim 1, further comprising holding the at least one region in place while drawing the preform.

19. A process for shaping a body with elongate structures comprising:
  providing a preform having the elongate structures, whereby at least one of the elongate structures is a groove, the elongate structures being elongate along one direction;
  heating the preform in at least one region by radiation which has a spectral distribution such that at most half of a radiation power is absorbed during a single pass through the preform, whereby radiation is impinged on the at least one region after it has been reflected or scattered and whereby radiation components which have already passed through the at least one region to be heated without being absorbed are directed back onto the preform by being scattered or reflected and thereby contribute to heating; and drawing the preform until at least part of the preform has adopted a cross section that substantially corresponds to a final cross-sectional shape of the body, wherein the maximum temperature difference along the cross section in the at least one region is less than 0.5° C., and whereby the groove in the shaped body is filled with a transparent material so that the material filled in the groove forms a waveguide.

20. The process as claimed in claim 19, wherein the maximum temperature difference is less than 0.1° C.

* * * * *